(12) United States Patent
Stafner

(10) Patent No.: US 6,480,776 B1
(45) Date of Patent: Nov. 12, 2002

(54) METHOD AND APPARATUS FOR CONTROLLING AN AUTOMATIC GEARBOX

(75) Inventor: Sven Stafner, Sollentuna (SE)

(73) Assignee: Scania CV AB (pub) (SE)

( * ) Notice: Subject to any disclaimer, the term of this patent is extended or adjusted under 35 U.S.C. 154(b) by 0 days.

(21) Appl. No.: 09/958,964

(22) PCT Filed: Apr. 13, 2000

(86) PCT No.: PCT/SE00/00703

§ 371 (c)(1),
(2), (4) Date: Oct. 15, 2001

(87) PCT Pub. No.: WO00/63592

PCT Pub. Date: Oct. 26, 2000

(30) Foreign Application Priority Data

Apr. 16, 1999 (SE) ................................ 9901350

(51) Int. Cl.$^7$ ............................................. F16H 61/02
(52) U.S. Cl. .............................. 701/51; 701/55; 701/57
(58) Field of Search ............................ 701/51, 55, 57; 477/98, 120, 121, 900, 902, 903, 904

(56) References Cited

U.S. PATENT DOCUMENTS

| 4,905,544 A | * | 3/1990 | Ganoung | 477/109 |
| 5,319,555 A | | 6/1994 | Iwaki et al. | 701/57 |
| 5,510,982 A | | 4/1996 | Ohnishi et al. | 701/55 |
| 5,595,551 A | * | 1/1997 | Hedstrom et al. | 477/109 |
| 5,672,139 A | | 9/1997 | Horiguchi | 477/120 |

FOREIGN PATENT DOCUMENTS

EP          0752548       1/1997

\* cited by examiner

Primary Examiner—William A. Cuchlinski, Jr.
Assistant Examiner—Marthe Y. Marc-Coleman
(74) Attorney, Agent, or Firm—Ostrolenk, Faber, Gerb & Soffen, LLP

(57) ABSTRACT

A process and an arrangement for the control of an automated gearbox. Control is conducted by determining possible gear combinations for driving, determining the operating points for the gear combinations, determining the specific fuel consumption at the operating points, selecting the gear combination with the lowest specific fuel consumption and emitting a command signal for changing to the selected gear combination.

10 Claims, 2 Drawing Sheets

METHOD AND APPARATUS FOR CONTROLLING AN AUTOMATIC GEARBOX

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a process and an arrangement for control of an automated gearbox. The invention is particularly applicable to mechanical servo-assisted gearboxes for heavy vehicles.

2. Description of the Related Art

Today's gearboxes of this kind are controlled by a control unit which controls gear selection so as to achieve engine operation which is appropriate in the light of experience. This has hitherto involved determining engine reference speeds at which changing up/down is in principle initiated. However, the control unit may also be designed to incorporate in the calculations the vehicle's acceleration and the accelerator pedal position in order to modify the control so that gear changing takes place at an engine speed which may be somewhat lower or somewhat higher than said reference speed. It is also possible for gear changing to be initiated in, for example, two stages instead of one. However, the known system is to be regarded as approximate and no optimisation of operation is possible on vehicles where that system is applied.

BRIEF SUMMARY OF THE INVENTION

An object of the present invention is to indicate a process and an arrangement for control of an automated gearbox, whereby control is further refined so that the operation of the vehicle can be optimised.

This object is achieved according to the invention by means of the features in the characterising part of patent claims 1 and 5 respectively.

The result is the possibility of selecting in each situation a gear combination which optimises or in practice minimises the vehicle's specific fuel consumption. By means of the invention, various possible and permissible gear alternatives can thus be compared with respect to specific fuel consumption at the operating point concerned so that the latter can be caused to lead to as economic driving as possible.

The process according to the invention involves:

the necessary drive power F being determined on the basis of the calculated running resistance at the prevailing running speed and in the prevailing operating conditions, possible gear combinations for driving being determined, possible gear combinations being monitored with respect to torque delivered and permissible engine speed, the operating points for the possible and permissible gear combinations being determined, the specific fuel consumption at said operating points being determined, the gear combination with the lowest specific fuel consumption being selected, and a command signal for changing to the selective gear being emitted.

The initiation of gear changes which involve one or more gears being skipped is thus not excluded.

A preferred aspect of the invention involves the process being initiated as an economy position after the control unit has, for example, detected that the running speed has for a certain period of time been approximately constant or that the accelerator pedal position has for a certain period of time been below a certain threshold value. This means that the control unit can independently initiate the process sequence, including the economy position, and achieve optimum specific fuel consumption.

Suppressing changes to a new gear combination so that the latter may only be initiated after a certain period of time eliminates excessive gear changing and the driver irritation involved in frequent gear changes.

The invention also relates to a control system suitable for implementing the process. This results in corresponding advantages. Further advantages are achieved as indicated by the following detailed description.

BRIEF DESCRIPTION OF THE SEVERAL VIEWS OF THE DRAWING(S)

The invention will now be described in more detail on the basis of an embodiment and with reference to the attached drawings, in which.

DETAILED DESCRIPTION OF THE INVENTION

Figure 1:
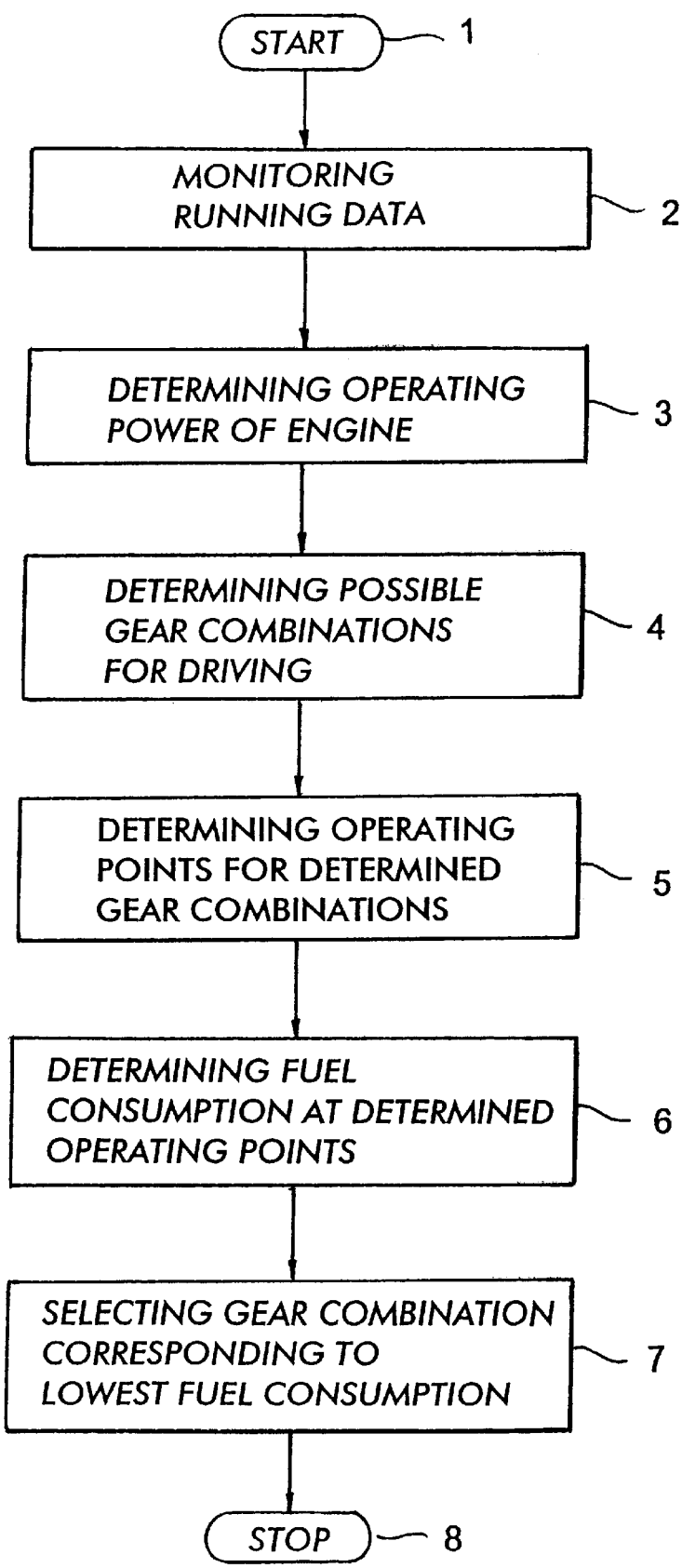
FIG. 1 shows a flow diagram of a process according to the invention.

In FIG. 1, ref. 1 represents the beginning of the sequence and ref. 2 the monitoring of running data with respect to whether the economy position can be initiated. This entails monitoring, for example, whether the running speed has for a certain period of time been approximately constant, whether the degree to which the accelerator pedal is depressed corresponds to the set-point for the prevailing operating conditions, etc. Ref. 3 represents determination of the necessary drive power on the basis of the calculated running resistance at the prevailing running speed and in the prevailing operating conditions. The running resistance value is preferably updated continuously by evaluation of incoming data concerning the engine, driveline, vehicle, roadway etc. Ref. 4 represents the determination of possible and permissible gear combinations for the prevailing driving situation and ref. 5 represents determination of the operating points for driving with these various gear combinations. Ref. 6 represents determination of the specific fuel consumption at these various operating points, which involves using information which may be derived from a so-called "mussel" diagram which shows the relationship between engine torque and engine speed with respect to the specific fuel consumption of the engine concerned. Ref. 7 represents comparison of the various operating points with respect to specific fuel consumption, resulting in selection of the gear combination corresponding to the lowest consumption. If the selected gear combination is not the gear combination engaged at the time, the length of the time which has passed since the previous gear change is monitored and if it exceeds a prescribed period of time, signals are transmitted to the relevant components to engage the selected gear combination. Ref. 8 represents the completion of the sequence.

Figure 2:
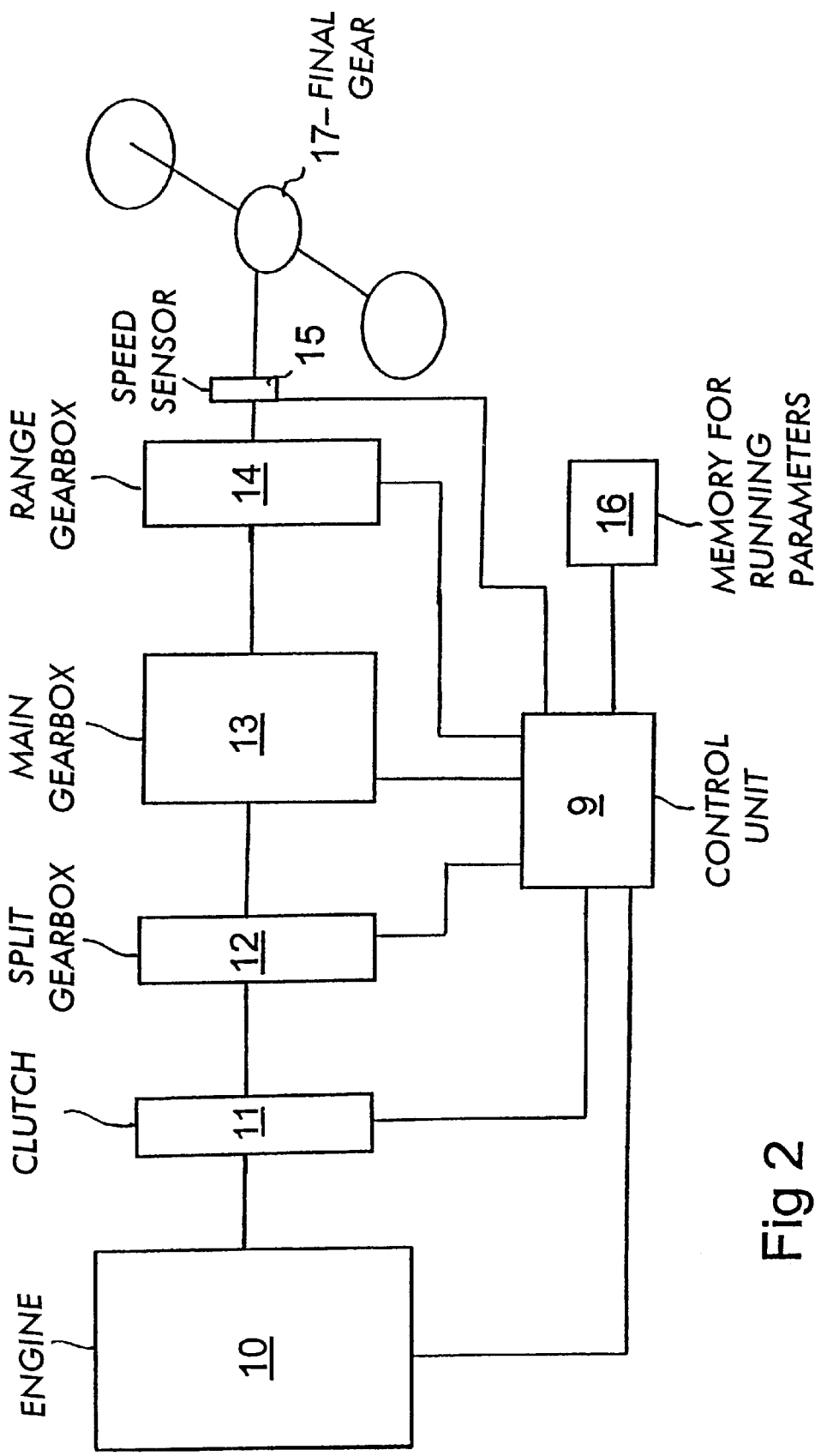
FIG. 2 illustrates an arrangement according to the invention in connection with the driveline for a heavy vehicle.

FIG. 2 illustrates schematically an arrangement for control according to the invention, in which ref. 9 represents a control unit which advantageously incorporates devices for control according to the invention which are integrated into or connected to the normal engine control system. Ref. 16 represents a memory for registering running parameters, vehicle weight, running resistance etc. which have to be taken into account in connection with the present invention.

In the driveline, the engine is denoted by 10, the clutch by 11 and the here triple gearbox by 12, 13 and 14, which may represent a division into split, main and range gearboxes. An output speed sensor is denoted by 15 and the final gear by 17.

The control unit 9 is designed to:

determine the necessary drive power F on the basis of the calculated running resistance at the prevailing running speed and in the prevailing operating conditions, determine possible gear combinations for driving, monitor possible gear combinations with respect to torque delivered and permissible engine speed, determine the operating points for the possible and permissible gear combinations, determine the specific fuel consumption for said operating points, select the gear combination with the lowest specific fuel consumption, and emit a command signal for changing to the gear selected.

The invention may be varied within the scope of the patent claims set out below. Thus the input data for the calculations may to some extent be varied but should preferably cover running speed, accelerator pedal position, vehicle weight, road gradient, fuel consumption information, gearchange conditions in the gearbox and, where applicable, in the various constituent gearboxes forming part of the gearbox, engine speed and torque curve. Gearchange times may also be incorporated in the calculations, in which case short changing times to certain gear combinations may result in their being preferred.

The process according to the invention, including an economy position, is thus relevant when the vehicle speed is relatively constant, the accelerator pedal is preferably not more than 50% depressed and the engine torque set-value is below a certain specified threshold level. Studies of the driving of heavy vehicles have shown that the economy mode is applicable during as much as 70–80% of running time, which indicates that there is substantial potential for saving which can be utilised by means of the invention, even if the reduction in consumption achieved by means of the invention is not more than a few percent.

EXAMPLE

In one example studied, a vehicle with a total weight of 60 tonnes was driven at a speed of 50 km/h. The gearbox used was a triple gearbox incorporating range, main and split gearboxes, designated SCANIA GRS900. The engine was a SCANIA DSC11413 and the vehicle was driven on a smooth horizontal stretch of road, with the results shown in the following table:

| Gear | Engine torque required (Nm) | Engine speed (rpm) | Specific fuel consumption (g/kWh) |
|---|---|---|---|
| 8 | 290 | 2070 | 260 |
| 9 | 380 | 1620 | 240 |
| 10 | 460 | 1320 | 230 |
| 11 | 580 | 1040 | 210 |

In the driving situation described above, gear 11 is selected for optimum fuel economy. If the vehicle had for example been driven in gear 10, the specific fuel consumption would have been about 9% higher. With previously known control systems, the vehicle might very well have been driven in that gear, resulting, in this specific case, in substantially higher fuel consumption for the run.

What is claimed is:

1. A process for the control of an automated gearbox for an engine, the process comprising:

determining operating power of the engine on the basis of a calculated running resistance at a prevailing running speed and in prevailing operating conditions of the engine;

determining possible gear combinations for driving;

monitoring possible gear combinations with respect to torque and speed of the engine;

determining operating points for the possible gear combinations;

determining specific fuel consumption at the operating points;

selecting a gear combination with a lowest specific fuel consumption; and emitting a command signal for changing to the selected gear combination.

2. The process according to claim 1, wherein the step of determining specific fuel consumption includes calculating gearchange times for the possible gear combinations.

3. The process according to claim 1, wherein the running resistance is calculated during operation of the vehicle and on the basis of running data for the vehicle.

4. The process according to claim 1, wherein the process is initiated as an economy mode after a variation in running parameters of the engine has been below a threshold value for a period of time.

5. The process according to claim 1, wherein changing from one gear combination to another gear combination may only be initiated after a certain period of time has elapsed.

6. The process according to claim 1, wherein the vehicle weight is calculated during operation of the vehicle and on the basis of running data for the vehicle.

7. An arrangement for control of an automated gearbox for an engine, the arrangement comprising:

a control unit which is operable to:

determine drive power of the engine on the basis of a calculated running resistance at a prevailing running speed and in prevailing operating conditions of the engine;

determine possible gear combinations for driving;

monitor possible gear combinations with respect to torque delivered and permissible engine speed;

determine operating points for the possible gear combinations;

determine specific fuel consumption for the operating points;

select the gear combination with a lowest specific fuel consumption; and emit a control signal for changing to the selected gear combination.

8. The arrangement according to claim 7, wherein the control unit is further operable to calculate gearchange times for the possible gear combinations and to incorporate the gearchange times in the determination of the specific fuel consumption.

9. The arrangement according to claim 7, wherein the control unit is operable to calculate, on the basis of running data for a vehicle having the arrangement, the running resistance of the engine during operation.

10. The arrangement according to claim 7, wherein the control unit is operable to calculate, on the basis of running data for a vehicle having the arrangement, the vehicle weight during operation.

* * * * *